United States Patent Office 3,261,815
Patented July 19, 1966

3,261,815
POLYMERS OF α,β-ETHYLENICALLY UNSATURATED DICARBOXYLIC ACIDS OR DERIVATIVES THEREOF AND 1,5-CYCLOOCTADIENE
Rostyslaw Dowbenko, Gibsonia, Pa., assignor to Pittsburgh Plate Glass Company, Pittsburgh, Pa., a corporation of Pennsylvania
No Drawing. Filed Oct. 21, 1964, Ser. No. 405,564
14 Claims. (Cl. 260—78.5)

This application is a continuation-in-part of application Serial No. 265,031, filed March 14, 1963, now abandoned.

This invention relates to novel interpolymers produced from 1,5-cyclooctadiene and an unsaturated dicarboxylic acid or a derivative thereof.

It is known that cyclic alkenes such as cyclohexene form 1:1 addition products with various reactive compounds. It has recently been discovered, however, that 1,5-cyclooctadiene does not react in certain instances in an analogous manner to produce simple addition compounds, but rather that it undergoes transannular rearrangements to produce bicyclo[3.3.0]octane derivatives.

It has now been further discovered that the reaction of 1,5-cyclooctadiene with an alpha,beta-ethylenically unsaturated dicarboxylic acid or with an anhydride or an ester of such an acid produces a novel interpolymer containing recurring bicyclo[3.3.0]octane groups in the polymer chain.

Among the acids which react with 1,5-cyclooctadiene to produce the polymers of this invention are maleic acid, chloromaleic acid, bromomaleic acid, dichloromaleic acid, itaconic acid, citraconic acid, fumaric acid, as well as other alpha,beta-ethylenically unsaturated dicarboxylic acids, most of which corresponds to the formula:

(I)
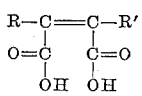

where R and R' are hydrogen, halogens, or alkyl, preferably having up to about 8 carbon atoms.

Anhydrides of those of the foregoing acids which form anhydrides may also be employed and in many instances are preferred over the acids. These include maleic anhydride, chloromaleic anhydride, itaconic anhydride, citraconic anhydride, and the like.

The polymerization may also be carried out using an ester of the acid, such as the methyl ester, ethyl ester, propyl ester, butyl ester, and similar esters of the foregoing acids. However, esters have been found to be somewhat less desirable for polymerization; when it is desired that the polymer contain ester groups, it is usually better to polymerize the acid or anhydride and then esterify the product with an alcohol. When the reaction is carried out using an ester, or when the preformed copolymer is reacted with an alcohol, either the half ester or the full ester of the dicarboxylic acid may be obtained, i.e., one or both of the acidic hydroxyl groups can be esterified.

The polymers produced in accordance with the invention contain recurring units in which bicyclo[3.3.0]octane groups and the dicarboxylic acid groups are connected, the points of attachment to the bicyclo[3.3.0]octane being in the 2-position and the 6-position. Thus, in the case of the polymers formed from the acid anhydrides, the polymer contains recurring units of the structure:

(II)
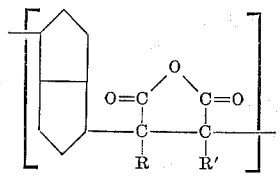

in which R and R' are either hydrogen, halogen, or alkyl, with, as indicated above, those alkyl groups of up to about 8 carbon atoms being preferred.

When an ester of the dicarboxylic acid is employed, the units of the polymer have the following structure:

(III)
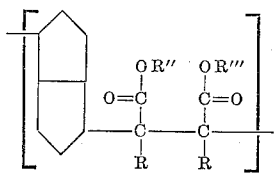

in which R and R' are as above and R" and R'" are hydrogen, or an organic radical derived by removing the hydroxyl group from a monohydric alcohol, depending upon whether the acid groups are esterified and the particular esterifying alcohol employed. Lower alkyl ester groups are preferred when an ester is polymerized, but ester-containing interpolymers produced by esterifying the acid or anhydride-containing product also can advantageously be made using any monohydric alcohol, including aromatic alcohols such as benzyl alcohol, and, more desirably, longer chain alcohols such as fatty alcohols. Thus R" and R'" in various products are preferably hydrogen, lower alkyl, or alkyl having up to about 25 or more carbon atoms, but they can be aromatic, e.g., aryl or alkaryl, as well as alkenyl, alkoxyalkyl, and the like.

The reaction when using a dicarboxylic acid appears in many instances to take place through the anhydride with the resulting product containing anhydride groups as in structure II above. In other instances, the product contains units as in structure III in which R" and R'" are hydrogen. Interpolymers in which R" and R'" are hydrogen can also be produced by hydrolysis of the corresponding anhydride-containing polymer.

The reaction conditions to produce the foregoing polymers are not critical; the polymerization reaction is usually carried out utilizing conditions at which free radical catalyzed addition reactions take place. A catalyst as such is not always necessary, but when a catalyst is not employed, elevated temperatures of at least 100° C. and preferably 150 to 250° C. should be used. Alternatively, a free radical-producing catalyst may be utilized. The preferred catalysts are peroxides, such as benzoyl peroxide and di(tertiary butyl) peroxide, although other known free radical-producing catalysts may be employed, including, for example, azo compounds such as azobis-(isobutyronitrile), ultraviolet light, and the like. While the amount of catalyst, when one is employed, is not critical, the reaction is generally carried out using at least about 0.02 mole percent catalyst based on 1,5-cyclooctadiene, although lower amounts can be employed if desired, and any amount in excess can be used. The polymerization is inhibited by hydroquinone, di-t-butyl mercaptan or similar compounds.

When a catalyst is present, the preferred temperature is one at which the catalyst yields free radicals at an appreciable rate. This temperature varies with the particular catalyst; for example, using benzoyl peroxide, the temperature should be at least 70° C.; with azobis(isobutyronitrile), at least 50° C.; with ditertiary butyl peroxide, 120° C. or higher. Lower temperatures may be employed but result in relatively slow rates of reaction.

The ratio of the 1,5-cyclooctadiene to the acid, anhydride or ester does not appear appreciably to affect the nature of the polymer. Thus, it has been found that polymers produced using varying proportions of the reactants usually contain substantially equimolar quantities of each of the monomers. A molar excess of either component may also be used.

A solvent is not necessary in carrying out the reaction; however, because the reaction is exothermic and because the reaction mixture tends to become quite viscous as the polymerization progresses, it is often desirable to employ a solvent. Aromatic hydrocarbon solvents or diluents, such as xylene, are satisfactory, although the polymeric product may precipitate from the solution as the reaction progresses. When other types of solvents, such as diethylene glycol dimethyl ether, are employed, a homogeneous reaction mixture is maintained. Other solvents of varying types can also be used.

As noted above, the polymers containing ester groups can be produced directly from esters of the dicarboxylic acid. However, such products are preferably produced by esterifying the interpolymers of the acid or anhydride by reaction with an alcohol. Essentially any monohydric alcohol can be used for the purpose, including, for example, methanol, ethanol, propanol, butanol, isobutanol, 2-ethylhexanol, and other alkanols of up to about 25 carbon atoms or more, including various fatty alcohols, such as decyl alcohol, lauryl alcohol, stearyl alcohol and linoleyl alcohol. There can also be utilized aromatic alcohols, such as benzyl alcohol and phenethyl alcohol; cyclic alcohols, such as cyclohexanol; monoethers of glycols, such as the Cellosolves and Carbitols; unsaturated alcohols, such as allyl alcohol; and substituted alcohols, such as 2,4,4,4-tetrachlorobutanol. The esterification reaction generally requires the use of an acidic catalyst and elevated temperatures, usually about 50° C. to 250° C. By regulating the conditions, there may be produced a product in which only one carboxyl group from each dicarboxylic acid unit is esterified, i.e., the half ester. Using more stringent conditions, such as higher temperatures, the full ester in which both carboxyl groups in each dicarboxylic acid unit are esterified may be obtained.

The half ester may also be obtained in the presence of basic catalysts, as by adding to the interpolymer a solution of one equivalent of a strong base, such as potassium hydroxide, in the alcohol.

Set forth below are several examples illustrating the invention in various of its embodiments.

EXAMPLE 1

*Reaction of 1,5-cyclooctadiene and maleic anhydride*

A mixture of 49.0 grams of maleic anhydride and 108.2 grams of 1,5-cyclooctadiene was stirred and heated to 150° C. As the reaction progressed the mixture became more viscous until stirring became impossible and heating was continued without stirring. After a total of 20 hours of heating, the mixture was cooled and the supernatant liquid was decanted. There remained 88.5 grams of a brittle, yellowish polymeric solid which no longer contained olefinic linkages. This polymer was purified by repeated dissolution in acetone and precipitation with petroleum ether (boiling point about 80° C.). There was obtained a nearly white solid identified as the interpolymer of maleic anhydride and 1,5-cyclooctadiene, having recurring bicyclo[3.3.0]octane groups. It had a melting point of 218 to 220° C., did not decolorize bromine, and had a molecular weight of 3350 (Rast method). It had an intrinsic viscosity of about 0.9 (in dimethylformamide). Although insoluble in most organic solvents, it was soluble in acetone, formamide, dimethylformamide, dimethyl sulfoxide, and N,N-dimethylacetamide. In the infrared, the interpolymer showed a strong doublet at 5.40 microns and 5.75 microns, but no unsaturation at about 6.0–6.2 microns. Also, it did not show bands characteristic of =CH stretching vibration.

EXAMPLE 2

The same interpolymer as in Example 1 was produced by heating a mixture of 324.6 grams of 1,5-cyclooctadiene, 294.3 grams of maleic anhydride, 3.0 grams of ditertiary butyl peroxide and 1000 milliliters of xylene to reflux (137° C.). At 60 to 65° C. the mixture became homogeneous, but upon heating to higher temperatures an insoluble oil precipitated which became viscous as the reaction progressed. After 24 hours at 120 to 137° C., the mixture was cooled and the solid obtained was purified as in Example 1. There was obtained 605 grams of the slightly yellow interpolymer.

EXAMPLE 3

*Reaction of 1,5-cyclooctadiene and chloromaleic anhydride*

A mixture of 21.6 grams of cyclooctadiene, 26.4 grams of chloromaleic anhydride, 0.4 gram of di(tertiary butyl) peroxide and 150 milliliters of xylene was heated to 146° C. After 24 hours the volatile material was removed by in vacuo and the residue dissolved in acetone and precipitated by the addition of petroleum ether (boiling point about 80° C.). After washing the semisolid precipitate several times with ether and drying, there was obtained 26.2 grams of the interpolymer.

EXAMPLE 4

*Hydrolysis of 1,5-cyclooctadiene–maleic anhydride interpolymer*

A mixture of 30 grams of the interpolymer produced in Example 1 and 50 milliliters of water was heated on a steam bath while adding slowly 54 milliliters of a 5.0 molar solution of sodium hydroxide in water. The solid was precipitated by acidifying with hydrochloric acid, washed well with water, and centrifuged. After drying, there were obtained 25.7 grams of the acid form of the interpolymer as shown by infrared and chemical analysis.

EXAMPLE 5

*Esterification of 1,5-cyclooctadiene–maleic anhydride interpolymer with butanol*

A mixture of 72.5 grams of hydrolyzed cyclooctadiene maleic anhydride interpolymer, 500 milliliters of butanol, 50 milliliters of xylene, and 1 gram of paratoluene sulfonic acid was refluxed for 18 hours. There were then added 10 milliliters of sulfuric acid and 50 milliliters of toluene and the mixture refluxed while removing the water evolved. From the neutral fraction there was obtained 82.0 grams of the dibutyl ester of the interpolymer. It had a melting point of 103–108° C. and was soluble in benzene and in ether, but insoluble in aqueous sodium hydroxide. Its molecular weight (by Mechrolab osmometer) was found to be 3550. It did not absorb hydrogen in the presence of a palladium catalyst.

EXAMPLE 6

*Esterification of 1,5-cyclooctadiene–maleic anhydride interpolymer with linseed fatty alcohol*

The linseed fatty alcohol ester of the interpolymer was produced by heating and stirring 48.8 grams of the interpolymer with 53.4 grams of linseed fatty alcohol having a molecular weight of 260–274 and a hydroxyl value of 205 to 215 (Unadol 40). The reaction was carried out at 170° C. for 10 hours and the product obtained was a glassy solid at room temperature.

EXAMPLE 7

*Esterification of 1,5-cyclooctadiene–maleic anhydride interpolymer with allyl alcohol*

To a solution of 39.5 grams of 85 percent potassium hydroxide and 300 grams of allyl alcohol there was added in small portions 124 grams of the 1,5-cyclooctadiene–maleic anhydride interpolymer. After stirring overnight, the excess of allyl alcohol was removed and the residue was dissolved in water. The solution was acidified and the resulting solid centrifuged, washed several times with water, and dried. There was obtained 140.5 grams of product having a melting point of 149 to 153° C., which was identified as the allyl half-acid ester of the interpolymer.

In these and other tests, it was shown that polymeric products are produced from the reaction of 1,5-cyclooctadiene with dicarboxylic acids, esters, and anhydrides of the class described above. While certain embodiments of the invention have been described and illustrated, other embodiments are contemplated within the scope of the invention. For example, similar polymers are obtained by the reaction of 1,5-cyclooctadiene with a mixture of dicarboxylic acids, anhydrides, and/or esters.

The polymeric products of the invention are useful in several ways. For instance, they form hard films, and as such can be utilized as the film-forming component of coating compositions. Thus, when applied as a solution to a metal or other surface and dried, either at ambient or elevated temperatures, they form a protective coating. They also function as curing agents for epoxy resins.

According to the provisions of the patent statutes, there are described above the invention and what are now considered to be its best embodiments. However, within the scope of the appended claims, it is to be understood that the invention can be practiced otherwise than as specifically described.

I claim:

1. An interpolymer produced by the free-radical initiated copolymerization of a mixture of monomers consisting essentially of 1,5-cyclooctadiene and a member of the class consisting of alpha,beta-ethylenically unsaturated dicarboxylic acids, their anhydrides and their esters, said interpolymer containing recurring bicyclo[3.3.0]octane groups in the polymer chain.

2. The interpolymer of claim 1 which contains recurring units of the structure:

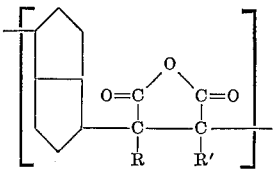

where R and R' are selected from the class consisting of hydrogen, halogen, and alkyl radicals.

3. The interpolymer of claim 1 which contains recurring units of the structure:

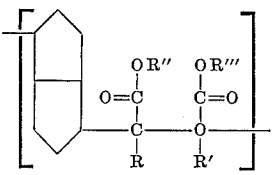

where R and R' are selected from the class consisting of hydrogen, halogens, and alkyl radicals, and R" and R'" are selected from the class consisting of hydrogen and an organic radical derived by removing the hydroxyl group from a monohydric alcohol.

4. The interpolymer of claim 3 in which R" and R'" are alkyl radicals of up to about 25 carbon atoms.

5. The interpolymer of claim 1 which contains recurring units of the structure:

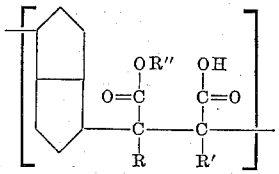

where R and R' are selected from the class consisting of hydrogen, halogens, and alkyl radicals, and R" is an organic radical derived by removing the hydroxyl group from a monohydric alcohol.

6. The interpolymer of claim 5 in which R" is an alkyl radical of up to about 25 carbon atoms.

7. The interpolymer of claim 1 which contains recurring groups of the structure:

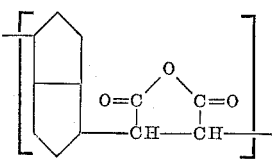

8. The method of producing a polymer containing recurring bicyclo[3.3.0]octane groups in the polymer chain which comprises copolymerizing a mixture of monomers consisting essentially of 1,5-cyclooctadiene and a member of the class consisting of alpha,beta-ethylenically unsaturated dicarboxylic acids, their anhydrides, and their esters at conditions which produce free radicals.

9. The method of claim 8 carried out in the absence of a catalyst and at a temperature of at least 100° C.

10. The method of claim 8 carried out in the presence of a free radical-producing catalyst.

11. The method of producing a polymer containing recurring units of the structure:

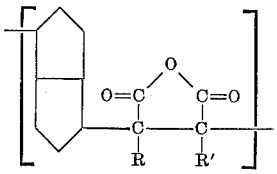

where R and R' are selected from the class consisting of hydrogen, halogens, and alkyl radicals, which comprises copolymerizing a mixture of monomers consisting essentially of 1,5-cyclooctadiene and an anhydride of an alpha-beta-ethylenically unsaturated dicarboxylic acid at conditions which produce free radicals.

12. The method of producing a polymer containing recurring units of the structure:

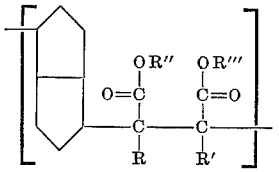

where R and R' are selected from the class consisting of hydrogen, halogens, and alkyl radicals and R" and R'" are selected from the class consisting of hydrogen and an organic radical derived by removing the hydroxyl group from a monohydric alcohol which comprises copolymerizing a mixture of monomers consisting essentially of 1,5-cyclooctadiene and a monohydric alcohol ester of an alpha-beta-ethylenically unsaturated dicarboxylic acid at conditions which produce free radicals.

13. The method of producing a polymer containing recurring units of the structure:

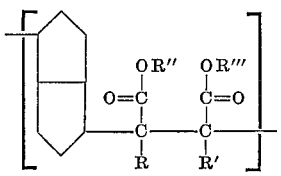

where R and R' are selected from the class consisting of hydrogen, halogens, and alkyl radicals and R'' and R''' are selected from the class consisting of hydrogen and an organic radical derived by removing the hydroxyl group from a monohydric alcohol which comprises copolymerizing a mixture of monomers consisting essentially of 1,5-cyclooctadiene and an anhydride of an alpha-beta-ethylenically unsaturated dicarboxylic acid at conditions which produce free radicals and further reacting the interpolymer thus produced with a monohydric alcohol.

14. The interpolymer of claim 1 in which said member is maleic anhydride.

References Cited by the Examiner
UNITED STATES PATENTS
2,876,894  3/1959  Dahlquist et al. ____ 260—88.5

OTHER REFERENCES
Cope et al.: J. of the Am. Chem. Soc., vol. 72, 1950, pp. 1128–1132.

JOSEPH L. SCHOFER, *Primary Examiner.*

L. WOLF, *Assistant Examiner.*

UNITED STATES PATENT OFFICE
CERTIFICATE OF CORRECTION

Patent No. 3,261,815                        July 19, 1966

Rostyslaw Dowbenko

It is hereby certified that error appears in the above numbered patent requiring correction and that the said Letters Patent should read as corrected below.

Column 5, lines 61 to 68, the formula should appear as shown below instead of as in the patent:

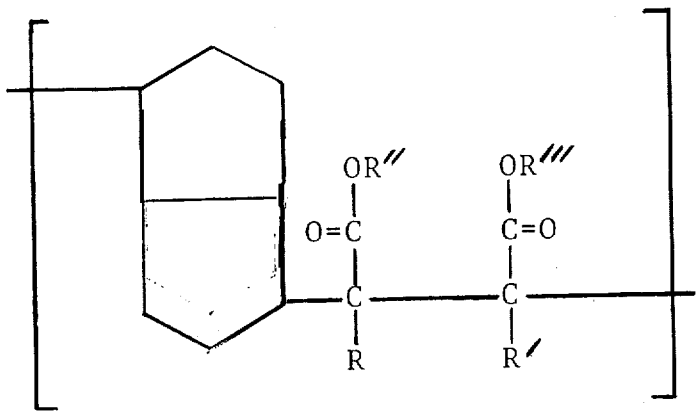

Signed and sealed this 26th day of September 1967.

(SEAL)
Attest:

ERNEST W. SWIDER                      EDWARD J. BRENNER
Attesting Officer                 Commissioner of Patents